United States Patent [19]

Kimura et al.

[11] Patent Number: 5,733,995
[45] Date of Patent: Mar. 31, 1998

[54] ORGANOPOLYSILOXANE COMPOSITION SUITED TO AUTOMOBILE OIL SEALS

[75] Inventors: Tsuneo Kimura, Annaka; Kazuyuki Suzuki, Matsuida-machi, both of Japan

[73] Assignee: Shin-Etsu Chemical Co., Ltd., Tokyo, Japan

[21] Appl. No.: 738,909

[22] Filed: Oct. 28, 1996

[30] Foreign Application Priority Data

Oct. 26, 1995 [JP] Japan .................. 7-301985

[51] Int. Cl.$^6$ .................................. C08G 77/08
[52] U.S. Cl. .................. 528/15; 528/16; 528/17; 528/18; 528/19; 528/34; 528/38
[58] Field of Search .................. 528/38, 34, 18, 528/17, 19, 15, 16

[56] References Cited

U.S. PATENT DOCUMENTS

| | | | |
|---|---|---|---|
| 4,585,849 | 4/1986 | Saykowski et al. | 528/38 |
| 5,086,107 | 2/1992 | Arai et al. | 524/588 |
| 5,300,611 | 4/1994 | Fujioka et al. | 528/38 |

*Primary Examiner*—Melvyn I. Marquis
*Attorney, Agent, or Firm*—Oblon, Spivak, McClelland, Maier & Neustadt, P.C.

[57] ABSTRACT

A organopolysiloxane composition suited to automobile oil seals is provided, which includes (A) a diorganopolysiloxane having a viscosity at 25° C. of 25 to 1,000,000 cSt blocked with a hydroxyl group at both ends of its molecular chain; (B) an iminoxysilane having the formula (1):

$$(R^1)_{4-n}Si[-O-N=C(R^1)_2]_n \qquad (1)$$

wherein $R^1$ are an unsubstituted or substituted monovalent saturated hydrocarbon group, and n is 3 or 4; (C) an amino group-containing hydrolyzable silane having the formula (2):

$$H_2N-R^2-NH-R^2-Si(-O-R^3)_3 \qquad (2)$$

wherein $R^2$ are an unsubstituted or substituted divalent saturated hydrocarbon group having 1 to 4 carbon atoms, and $R^3$ are a monovalent saturated hydrocarbon group having 1 to 4 carbon atoms; and (D) a curing catalyst. The composition is able to maintain a low foamability even when dispersed or dissolved in automobile oils, and is cured to provide an automobile oil seal.

7 Claims, No Drawings

ORGANOPOLYSILOXANE COMPOSITION SUITED TO AUTOMOBILE OIL SEALS

BACKGROUND OF THE INVENTION

1. Field of the Invention

The present invention relates to an organopolysiloxane composition which is suited to automobile oil seals, and particularly to a composition capable of maintaining a low foamability even when dispersed or dissolved in automatic transmission oils, and an automobile oil seal obtained by curing the composition.

2. Description of the Prior Art

As an oil seal for use in preventing leak of various automobile engine oils, there have hitherto been used oil-resistant solid gasket and packing materials made of a cork, an organic rubber, an asbesto, etc. These materials have the disadvantages that their stock control and work process are complicated and further they have a low reliability in sealing performance.

Accordingly, a seal method called FIPG (Formed In Place Gaskets) procedure has been employed. The procedure comprises, when an engine is assembled, coating a one-pack type room temperature curable organopolysiloxane composition on the surface, which is to be sealed, of each of engine blocks, adhering the surfaces of the engine blocks to each other, and bolting these blocks. This procedure is set a high valuation on workability, sealing performance and heat resistance.

SUMMARY OF THE INVENTION

Frequently in an engine assembled while conducting oil-sealing according to the FIPG procedure, various oils are generally poured into the engine immediately after the assembling was over and then a starting test is conducted. However, the room temperature curable organopolysiloxane composition as aforementioned requires a relatively long time for curing. When the room temperature curable composition is not sufficiently cured in the starting test, part of the composition results in dispersing or dissolving in the oils. Particularly when dispersed or dissolved in an automatic transmission oil (ATF), foaming of the oil is promoted since the structure of the transmission per se is complicated, whereby the oil may be jetted through an oil filler opening provided on the upper portion of the engine.

Accordingly, the FIPG procedure is employed in engine oil seals and gear oil seals for automobiles provided with a manual transmission but scarcely employed in transmission oil seals for automobiles provided with an automatic transmission.

Thus, there is demanded a one-pack type room temperature curable organopolysiloxane composition capable of maintaining a low foamability even when used as automatic transmission oil seals.

For the above reason, the present inventors have studied the foamability of automobile oils, such as automatic transmission oils, when a one-pack type room temperature curable organopolysiloxane composition was dispersed or dissolved in the automobile oils, and as a result, they have found that a specified organopolysiloxane composition exhibited an excellent low foamability.

The present invention provides an organopolysiloxane composition which is favorably used in automobile oil seals comprising:

(A) a diorganopolysiloxane having a viscosity at 25° C. of 25 to 1,000,000 cSt blocked with a hydroxyl group at both ends of its molecular chain;

(B) an iminoxysilane represented by the following general formula (1):

$$(R^1)_{4-n}Si[-O-N=C(R^1)_2]_n \quad (1)$$

wherein $R^1$ are the same or different and are an unsubstituted or substituted monovalent saturated hydrocarbon group, and n is 3 or 4;

(C) an amino group-containing hydrolyzable silane represented by the following general formula (2):

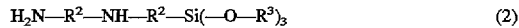

$$H_2N-R^2-NH-R^2-Si(-O-R^3)_3 \quad (2)$$

wherein $R^2$ are an unsubstituted or substituted divalent saturated hydrocarbon group having 1 to 4 carbon atoms, and $R^3$ are a monovalent saturated hydrocarbon group having 1 to 4 carbon atoms; and (D) a curing catalyst.

The present invention also provides an automobile oil seal obtained by curing said composition.

The organopolysiloxane composition of the present invention promotes only slightly the flowability of automobile oils even when dispersed or dissolved in the automobile oils. The composition is particularly useful for automatic transmission oil seals, said oil being liable to foam due to the complicated structure of the transmission.

DETAILED DESCRIPTION OF THE PREFERRED EMBODIMENTS

Component (A)

The component (A) of the composition according to the present invention is a diorganopolysiloxane blocked with a hydroxyl group at both ends of its molecular chain and is represented by the following general formula (3):

$$HO(R_2SiO)_xH \quad (3)$$

wherein R are an unsubstituted or substituted monovalent hydrocarbon group having generally 1 to 10 carbon atoms, and preferably 1 to 8 carbon atoms.

The R of the general formula (3) includes, for example, an alkyl group such as methyl, ethyl, propyl and butyl groups; a cycloalkyl group such as a cyclohexyl group; an alkenyl group such as vinyl and allyl groups; an aryl group such as phenyl and tolyl groups; an aralkyl group such as benzyl and phenylethyl groups; or a radical obtained by substituting part or the whole of the hydrogen atoms bonded to the carbon atoms of said groups with a halogen atom, a cyano group or the like, such as chloromethyl, trifluoropropyl and cyanoethyl radicals,. Among them, particularly preferred are a methyl group and a phenyl group in view of easy availability and easy handling.

The X (that is, a degree of polymerization) of the general formula (3) is a number such that the viscosity at 25° C. of the diorganopolysiloxane is in the range of 25 to 1,000,000 cSt, preferably 1,000 to 100,000 cSt, and more preferably 5,000 to 50,000 cSt; and is generally an integer of 10 or more. If the viscosity is less than 25 cSt, a satisfactory sealing performance can not be obtained since the elongation of a silicone rubber obtained after cured is reduced. In contrast, if it is more than 1,000,000 cSt, workability is lowered since the viscosity of the composition before curing becomes high.

Component (B)

The component (B) of the composition according to the present invention is an iminoxysilane represented by the following general formula (1):

wherein $R^1$ are the same or different and are an unsubstituted or substituted monovalent saturated hydrocarbon group, and n is 3 or 4, and acts as a crosslinking agent for the component (A).

If the $R^1$ is an unsaturated hydrocarbon group, when the composition of the present invention was dispersed or dissolved in an automatic transmission oil, a low foamability is not obtained.

The number of carbon atoms in $R^1$ is generally 1 to 12, and preferably 1 to 6, and specific examples of $R^1$ include methyl, ethyl and propyl groups.

Specific examples of said iminoxysilane include tetrabutanoximesilane, methyltributanoximesilane, ethyltributanoximesilane, propyltributanoximesilane and methyltri-3-pentanoximesilane, and preferably methyltributanoximesilane. Said iminoximesilane is not limited to use singly, but may be used in a combination of two or more thereof.

In order to obtain the above iminoxysilane, it may be prepared in accordance with known methods, for example, a method comprising reacting organochlorosilane and hydroxyimine in the presence of a basic catalyst. The basic catalyst includes triethylamine and urea.

The amount of the component (B) to be compounded is generally 3 to 20 parts by weight, and preferably 5 to 15 parts by weight, per 100 parts by weight of the component (A). If the amount of the component (B) is too small, crosslinking of the composition may proceed during kneading or before the use of the composition, resulting in an increase of the viscosity of the composition or in inducing gelation of the composition. In contrast, if the amount is too larger, physical properties of a rubber obtained after curing the composition is lowered.

Component (C)

The component (C) of the composition according to the present invention is an amino group-containing hydrolyzable silane represented by the following general formula (2):

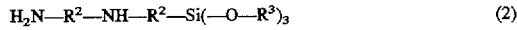

wherein $R^2$ are an unsubstituted or substituted divalent saturated hydrocarbon group having 1 to 4 carbon atoms, and $R^3$ are a monovalent saturated hydrocarbon group having 1 to 4 carbon atoms, and improves the adhesive properties of the composition according to the present invention.

If the amino group-containing organic group bonded to the silicon atom of the component (C) is a group other than $H_2N-R^2-NH-R^2-$ group [N-(aminoalkyl)aminoalkyl group], a low foamability in an automatic transmission oil can not be obtained.

Specific examples of the amino group-containing hydrolyzable silane represented by the general formula (2) include N-(β-aminoethyl)-γ-aminopropyltrimethoxysilane, N-(β-aminoethyl)-β-aminoethyltrimethoxysilane, N-(β-aminoethyl)-aminomethyltrimethoxysilane and N-(γ-aminopropyl)-γ-aminopropyltrimethoxysilane, and preferably N-(β-aminoethyl)-γ-aminopropyltrimethoxysilane.

The amount of the component (C) to be compounded is generally 0.1 to 5 parts by weight, and preferably 0.5 to 3 parts by weight, per 100 parts by weight of the component (A). If the amount of the component (C) compounded is too small, it is impossible to provide sufficient adhesive properties to the composition. In contrast, if the amount is too large, the physical properties of a rubber obtained after curing the composition is lowered.

Component (D)

The component (D) of the composition according to the present invention is a curing catalyst and includes, for example, organotin ester compounds such as dibutyltin dioctoate, dibutyltin dilaurate and dioctyltin benzylmaleate; tin chelate compounds such as tin bisacetylacetonate; tin carboxylates such as tin naphthenate, stannous caprylate and tin oleate; titanic acid esters or titanium chelate compounds, such as tetraisopropoxytitanium, tetra-n-butoxytitanium, tetrakis(2-ethylhexoxy)titanium, dipropoxybis(acetylacetonato)titanium and titanium isopropoxyoctylene glycol; and organometallic compounds such as zinc naphthenate, zinc 2-ethyloctoate, iron 2-ethylhexoate, cobalt 2-ethylhexoate, manganese 2-ethylhexoate, cobalt naphthenate and alkoxyaluminum compounds. Among them, preferred are organotin ester compounds and tin chelate compounds, and more preferred are dibutyltin dioctoate and dibutyltin dilaurate.

The amount of the component (D) to be compounded may be a so-called catalytic amount. For example, in the case of organotin ester compounds or tin chelate compounds, the amount is generally 0.01 to 2 parts by weight, and preferably 0.1 to 1 part by weight, per 100 parts by weight of the component (A). If the amount of the component (D) is too small, a sufficient curability can not be provided. In contrast, if it is too large, the physical properties of a rubber obtained after curing the composition are lowered.

Other Additives

In addition to the components (A) to (D), if necessary, various compounds can be added to the composition of the present invention. Examples of them include reinforcing agents such as fumed silica, precipitated silica, silica powder, carbon powder, talc and bentonite; fibrous fillers such as asbesto, glass fiber, carbon fiber and organic fiber; basic fillers such as calcium carbonate, zinc carbonate, zinc oxide, magnesium oxide and celite; heat-resistance improvers such as red oxide and cerium oxide; cold-resistance improvers; dehydrating agents; anti-corrosive agents; pigments; diluents such as diorganopolysiloxanes blocked with triorganosiloxy groups at the ends of its molecular chain; liquid reinforcing agents such as a network polysiloxane comprised of triorganosiloxy units and $SiO_2$ units. They may be used singly or in a combination of two or more thereof, provided that the amounts of them to be compounded are in such a range that a low foamability in automobile oils is not injured.

For example, the amount of the reinforcing agent to be compounded is generally 0 to 500 parts by weight, and preferably 2 to 50 parts by weight, per 100 parts by weight of the component (A).

Preparation of the Organopolysiloxane Composition and its Curing

The composition of the present invention is prepared as a one-pack type room temperature curable composition by uniformly mixing the components (A) to (D) and, if necessary, other additives in a dry atmosphere.

Also, by leaving the above composition to stand in a wet atmosphere, the composition can be cured.

EXAMPLES

The present invention will now be described in detail below, with reference to working examples and comparative examples. Incidentally, all parts in these examples are parts by weight.

Example 1

100 parts of (A) a dimethylpolysiloxane having a viscosity at 25° C. of 20,000 cSt blocked with a hydroxyl group at both ends of its molecular chain, 9.0 parts of (B) methyltributanoximesilane, 1.0 part of (C) (N-(β-aminoethyl)-γ-aminopropyltrimethoxysilane, 0.2 part of (D) dibutyltin dioctoate, 10.0 parts of a dimethylpolysiloxane having a viscosity at 25° C. of 10,000 cSt blocked with a trimethylsilyl group at both ends of its molecular chain, and 10 parts of a fumed silica with a specific surface area of 110 m$^2$/g the surface of which has been hydrophobic-treated were mixed in an anhydrous state to prepare a room temperature curable organopolysiloxane composition.

Then, 5 g of the resulting composition was gathered and dissolved in 1,000 g of an automatic transmission oil (tradename: Toyota Junsei Castle Autofluid D-2), followed by maintaining the oil on a 120° C. oil bath for 72 hours.

Thereafter, the automatic transmission oil was tested for foamability at each of temperatures of the oil being 24° C., 93° C., and 24° C., in accordance with JIS-K-2518. As a result, the respective degrees of foamability were 20 cc, 10 cc, and 20 cc, and the respective degrees of foam stability were each 0 cc.

Examples 2–4, Comparative Examples 1–3

In each of Examples and Comparative Examples, an organopolysiloxane composition was prepared in the same manner as in Example 1, except that the components (A) to (D) and other additives used in Example 1 were replaced with those shown in Table 1, and the foamability test was conducted for the composition in the same procedure as in Example 1. The results are shown in Table 2.

TABLE 1

| Component | Amount compounded | Example 1 | Example 2 | Example 3 | Comparative Example 1 | Comparative Example 2 | Comparative Example 3 | Example 4 |
|---|---|---|---|---|---|---|---|---|
| (A) | 100 parts | Dimethylpolysiloxane with a viscosity at 25° C. of 20,000 cSt blocked with a hydroxyl group at both ends of its molecular chain | | | | | | |
| (B) | 9.0 parts | Methyltri-butanoxime-silane | Methyltri-butanoxime-silane | Ethyltri-butanoxime-silane | Vinyltri-butanoxime-silane | Methyltri-butanoxime-silane | Vinyltributan-oximesilane | Methyltri-butanoxime-silane |
| (C) | 1.0 part | N-(β-amino-ethyl)-γ-amino-propyl-trime-thoxy-silane | N-(β-amino-ethyl)-γ-amino-propyl-trimethoxy-silane | N-(γ-amino-propyl)-γ-aminopropyl-trimethoxy-silane | γ-aminopropyl-trimethoxy-silane | γ-amino-propyltri-methoxysilane | N-(β-amino-ethyl)-γ-amino-propyltri-methoxysilane | N-(β-amino-ethyl)-γ-aminopropyl-trimethoxy-silane |
| (D) | 0.2 part | Dibutyltin dioctoate | Dioctyltin-dibenzyl-maleate | Dibutyltin-dioctoate | Dibutyltin dioctoate | Dioctyltin dibenzyl-maleate | Dibutyltin dioctoate | Dibutyltin dioctoate |
| Other additives | 10.0 parts | Dimethylpolysiloxane with a viscosity at 25° C. of 10,000 cSt blocked with a trimethylsilyl group at both ends of its molecular chain | | | | | | — |
| | 10.0 parts | Fumed silica with a specific surface area of 110 m$^2$/g the surface of which has been hydrophobic-treated | | | | | | |

TABLE 2

| Temperature | Foamability | Example 1 | Example 2 | Example 3 | Comp. Example 1 | Comp. Example 2 | Comp. Example 3 | Example 4 |
|---|---|---|---|---|---|---|---|---|
| 24° C. | Degree of foaming | 20 | 10 | 20 | 180 | 270 | 380 | 20 |
|  | Degree of foam stability | 0 | 0 | 0 | 0 | 0 | 0 | 0 |
| 93° C. | Degree of foaming | 10 | 10 | 10 | 35 | 30 | 50 | 10 |
|  | Degree of foam stability | 0 | 0 | 0 | 0 | 0 | 0 | 0 |
| 24° C. | Degree of foaming | 20 | 20 | 10 | 280 | 300 | 400 | 20 |
|  | Degree of foam stability | 0 | 0 | 0 | 0 | 0 | 0 | 0 |

(Note) The unit of a degree of foamability and the unit of a degree of foam stability are each cc.

What is claimed is:

1. An organopolysiloxane composition comprising:
   (A) a diorganopolysiloxane having a viscosity at 25° C. of 25 to 1,000,000 cSt blocked with a hydroxyl group at both ends of its molecular chain;
   (B) an iminoxysilane represented by the following general formula (1):

$$(R^1)_{4-n}Si[-O-N=C(R^1)_2]_n \quad (1)$$

wherein $R^1$ groups are the same or different and are an unsubstituted or substituted monovalent saturated hydrocarbon group, and n is 3 or 4;
   (C) an amino group-containing hydrolyzable silane represented by the following general formula (2):

$$H_2N-R^2-NH-R^2-Si(-O-R^3)_3 \quad (2)$$

wherein $R^2$ groups are an unsubstituted or substituted divalent saturated hydrocarbon group having 1 to 4 carbon atoms, and $R^3$ are a monovalent saturated hydrocarbon group having 1 to 4 carbon atoms; and
   (D) a curing catalyst.

2. The organopolysiloxane composition according to claim 1, wherein the number of carbon atoms in $R^1$ of said component (B) is 1 to 12.

3. The organopolysiloxane composition according to claim 1, wherein said component (B) is at least one compound selected from the group consisting of tetrabutanoximesilane, methyltributanoximesilane, ethyltributanoximesilane, propyltributanoximesilane and methyltri-3-pentanoximesilane.

4. The organopolysiloxane composition according to claim 1, wherein said component (C) is at least one compound selected from the group consisting of N-(β-aminoethyl)-γ-aminopropyltrimethoxysilane, N-(β-aminoethyl)-β-aminoethyltrimethoxysilane, N-(β-aminoethyl)-aminomethyltrimethoxysilane and N-(γ-aminopropyl)-γ-aminopropyltrimethoxysilane.

5. The organopolysiloxane composition according to claim 1, containing 100 parts by weight of said component (A), 3 to 20 parts by weight of said component (B), 0.1 to 5 parts by weight of said component (C) and a catalytic amount of said component (D).

6. An automobile oil seal obtained by curing the composition of claim 1.

7. The organopolysiloxane composition according to claim 1, wherein the substituents of the hydrocarbon groups are halogen or cyano.

* * * * *